United States Patent
Graf

(10) Patent No.: US 9,308,653 B2
(45) Date of Patent: Apr. 12, 2016

(54) INDUSTRIAL ROBOT AND METHOD FOR OPERATING AN INDUSTRIAL ROBOT

(75) Inventor: Rene Graf, Amberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 1850 days.

(21) Appl. No.: 12/488,647

(22) Filed: Jun. 22, 2009

(65) Prior Publication Data

US 2010/0017029 A1    Jan. 21, 2010

(30) Foreign Application Priority Data

Jul. 16, 2008  (EP) .................................... 08012849

(51) Int. Cl.
| | |
|---|---|
| *G06F 19/00* | (2011.01) |
| *G06N 3/00* | (2006.01) |
| *B25J 19/00* | (2006.01) |
| *B62D 57/032* | (2006.01) |
| *G05D 1/02* | (2006.01) |
| *H02K 35/02* | (2006.01) |

(52) U.S. Cl.
CPC .............. *B25J 19/00* (2013.01); *B62D 57/032* (2013.01); *G05D 1/0274* (2013.01); *G06N 3/008* (2013.01); *H02K 35/02* (2013.01); *G05B 2219/39001* (2013.01)

(58) Field of Classification Search
CPC ... G06N 3/008; B62D 57/032; G05D 1/0274; B25J 19/00; H02K 35/02; G05B 2219/39001
USPC ........... 700/19, 195, 245–247, 258, 259, 254, 700/264; 318/565, 568.1–568.17; 414/729, 414/730; 901/2, 9
See application file for complete search history.

(56) References Cited

U.S. PATENT DOCUMENTS

| | | | |
|---|---|---|---|
| 6,463,357 B1 | 10/2002 | An | |
| 6,760,980 B1* | 7/2004 | Golinelli | 33/832 |
| 7,530,739 B2* | 5/2009 | Lurz et al. | 378/198 |
| 7,774,952 B2* | 8/2010 | Lubgins et al. | 33/788 |
| 7,971,487 B2* | 7/2011 | Carlen et al. | 73/760 |
| 2001/0029678 A1* | 10/2001 | Golinelli | 33/556 |
| 2005/0140212 A1 | 6/2005 | Arms | |
| 2006/0085092 A1* | 4/2006 | Redecker et al. | 700/175 |
| 2006/0287768 A1* | 12/2006 | Bader et al. | 700/245 |
| 2007/0276538 A1* | 11/2007 | Kjellsson et al. | 700/245 |
| 2007/0278997 A1 | 12/2007 | Chang et al. | |
| 2008/0030355 A1 | 2/2008 | Lange et al. | |
| 2008/0284258 A1 | 11/2008 | Spratte et al. | |
| 2009/0204260 A1* | 8/2009 | Bryne et al. | 700/259 |

FOREIGN PATENT DOCUMENTS

| | | |
|---|---|---|
| CN | 1328310 A | 12/2001 |
| DE | 101 63 734 A1 | 7/2003 |
| DE | 103 58 764 A1 | 7/2005 |
| DE | 10 2004 054 764 A1 | 6/2006 |
| DE | 10 2006 009 979 A1 | 9/2007 |
| DE | 10 2006 030 834 A1 | 1/2008 |
| EP | 1 591 210 A1 | 11/2005 |
| GB | 2 311 171 A | 9/1997 |

OTHER PUBLICATIONS

Gunther Naumann, "Energiewandlersystem für Den Betrieb Von Autarken Sensoren in Fahrzeugen", Jul. 4, 2003, pp. 1-4, 13-17, Technische Universität Dresden, Germany.

* cited by examiner

*Primary Examiner* — Behrang Badii
*Assistant Examiner* — Majdi Alsomiri

(57) ABSTRACT

An industrial robot with a robotic arm and a data recording module connected to the robotic arm is described. The data recording module is designed for a wireless communication and has a self-sufficient power supply with a converter unit by which mechanical energy is converted into electrical energy, the energy from the movement of the robotic arm being used therefore.

19 Claims, 2 Drawing Sheets

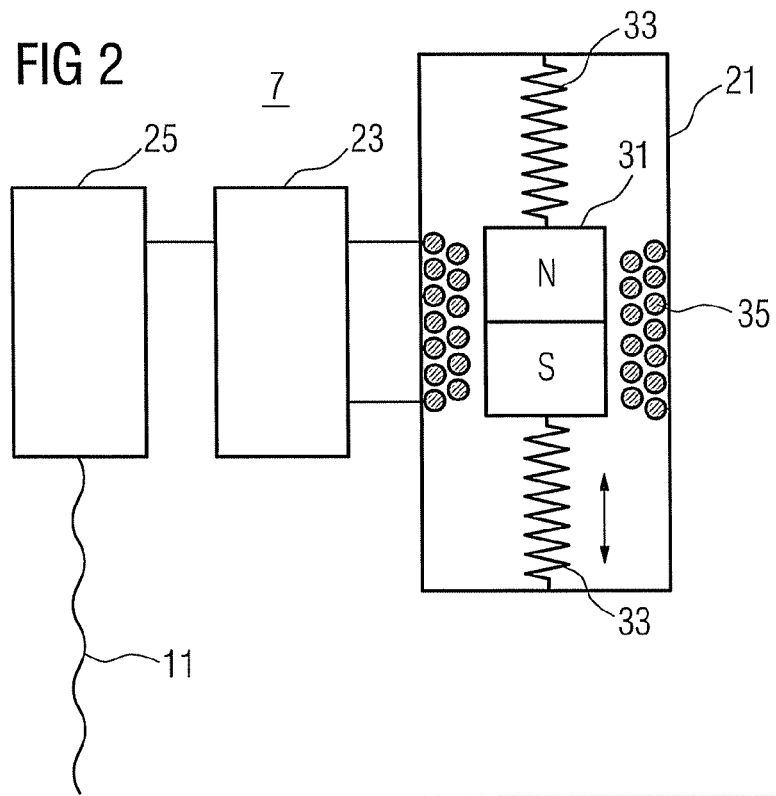
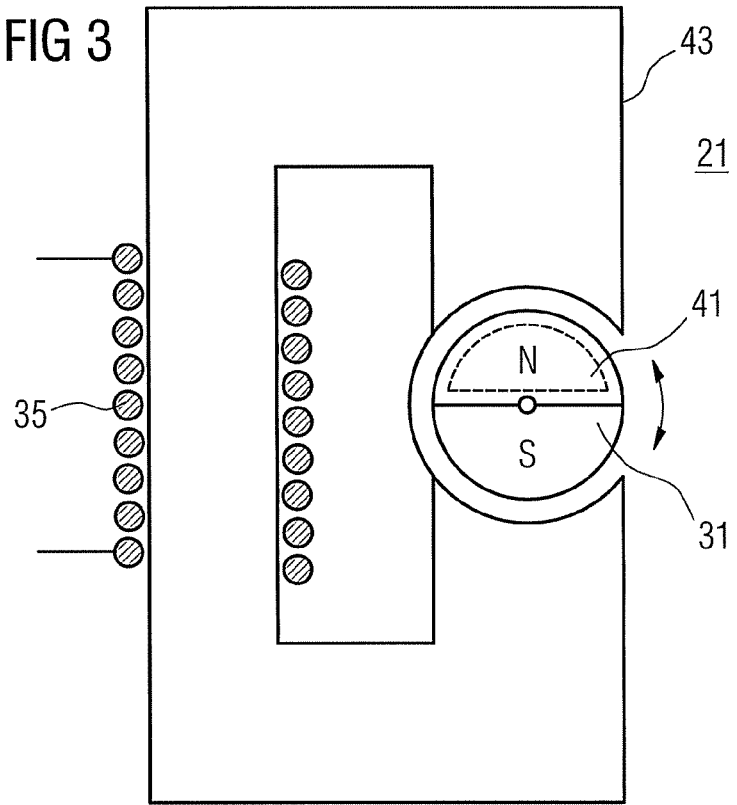

INDUSTRIAL ROBOT AND METHOD FOR OPERATING AN INDUSTRIAL ROBOT

CROSS REFERENCE TO RELATED APPLICATIONS

This application claims priority of European Patent Application No. 08012849.9 EP filed Jul. 16, 2008, which is incorporated by reference herein in its entirety.

FIELD OF INVENTION

The invention relates to an industrial robot with a robotic arm and a data recording module. The invention also relates to a method for operating such an industrial robot.

BACKGROUND OF INVENTION

A device for wireless communication with a field device is known from DE 10 2006 009 979 A1. In the field of industrial automation, a trend exists involving the increasing use of wireless communication in automation networks. The omission of the wiring in process-oriented automation components namely results in a considerable cost saving when setting up a process-related installation. One central problem with the wireless connection of sensors and data modules consists however in the provision of an autonomous power supply, since a cabling for the power supply would considerably reduce the advantage from the omission of the data lines. DE 10 2006 009 979 A1 proposes using a radio module, with which a battery storage is operated by an energy management unit in a fashion such that the service life is extended.

DE 10 2006 030 834 A1 discloses a sensor system for monitoring processing steps in the case of machine tools. It is important for such sensor systems that their measuring devices are assembled in the vicinity of the machining tool in order to be able to register relevant measured quantities of the processing step. One problem here represents the power supply. A power supply by way of cables is unfavorable if the measuring device is mounted on a rapidly moving part of the machine tool, like a tool spindle. To solve this problem, DE 101 63 734 A1 proposes for instance using a wireless power supply according to the principle of a transformer, with energy being wirelessly transmitted from a primary coil to a secondary coil. DE 10 2006 030 834 A1 accordingly proposes using two power supply systems, with the one receiving wireless energy from a surrounding electromagnetic field, and the other being operated using a battery.

In the dissertation "Energiewandlersysteme für den Betrieb von autarken Sensoren in Fahrzeugen", [Energy conversion systems for operating self-sufficient sensors in motor vehicles] Gunther Naumann, Technische Universität Dresden, 04.07.2003, solutions are examined for a self-sufficient power supply by means of mechanical-electrical converters in motor vehicles. The significant increase in electronic systems in motor vehicles and thus in sensors results in the need to save on cables in order to reduce weight and costs and increase the reliability. The movement of motor vehicles can be used for a self-sufficient power supply of these sensors. Rotationally and translationally operating converters are examined.

SUMMARY OF INVENTION

An object of the invention is to specify an industrial robot comprising a communication system which is low-maintenance and easy and cost-effective to install. A further object of the invention is to specify a corresponding method for operating an industrial robot.

The object is achieved in accordance with the invention by specifying an industrial robot with a robotic arm and a data recording module connected to the robotic arm, which is designed for a wireless communication, with the data recording module having a self-sufficient power supply with a converter unit, by means of which mechanical energy can be converted into electrical energy and with the energy from the movement of the robotic arm being used herefor.

In the case of industrial robots, special conditions exist within the afore-cited automation technology. Their complex, freely definable movements and a frequently particularly high level of electromagnetic radiation background, e.g. with robot welders but also as a result of the driver engineering of the robots require particular measures for a communication technology. This technology is installed at least partially at the end of a robotic arm in order to control and monitor the performed work steps using sensors and to transmit the data required therefor. Due to the drive engineering of the robotic motor activity, cabling already exists, so that a cable-free communication technology is barely advantageous and at the same time, due to the high noise background and the additional constantly changing position of the communication and measuring modules arranged on the operating robotic arm appears to be particularly problematical.

The invention is nevertheless based on the knowledge that a cable-free communication technology can still offer considerable advantages, since the cables are subject to particular loads and thus to an increased sensitivity and maintenance outlay due to the robotic movements. In this way, the invention provides a particularly suitable storage device for a self-sufficient operation of the communication technology for this special application, which uses the movement of the robot and thus in principle persists throughout the entire service life of the robot. The storage device based on a mechanical-electrical conversion nevertheless also offers a greater density of electromagnetic energy than for example an energy consumption from a surrounding electrical field and thus the possibility for transmission powers which overcome the problem of a high noise background, the changing position and possible shielding effects resulting therefrom.

The converter unit preferably converts a translational movement into electrical energy. The converter unit preferably converts a rotational movement into electrical energy. The converter unit further preferably converts a rotational and translational movement into electrical energy. The converter unit can thus be adjusted to predominant motion sequences of the robot such that they achieve a particularly high degree of efficiency.

The data recording module preferably has an energy storage device, in which the generated electrical energy can be stored. The energy is thus not (only) directly used for communication or measuring purposes, but is, if surplus, stored in a storage device, e.g. an accumulator.

The data recording module preferably communicates by means of an industrial W-LAN communication standard, by means of a Bluetooth communication standard or by means of a ZigBee communication standard.

The data recording module is preferably arranged at a position of maximum average movement of the robotic arm.

The object focused on specifying a method is achieved by a method for operating an industrial robot with a robotic arm and a data recording module connected to the robotic arm, which is designed for a wireless communication, with the data recording module having a self-sufficient power supply with a converter unit, by means of which mechanical energy is converted into electrical energy and with the energy from the movement of the robotic arm being used herefor.

The advantages of this method correspond to the embodiments relating to the advantages of the industrial robot.

BRIEF DESCRIPTION OF THE DRAWINGS

The invention is described in more detail, but not to scale, with reference to the drawing with an exemplary embodiment, in which FIG. 2 shows a schematic representation of a data recording module with a translational converter unit, FIG. 3 shows a schematic representation of a rotational converter unit.

DETAILED DESCRIPTION OF INVENTION

Figure 1:
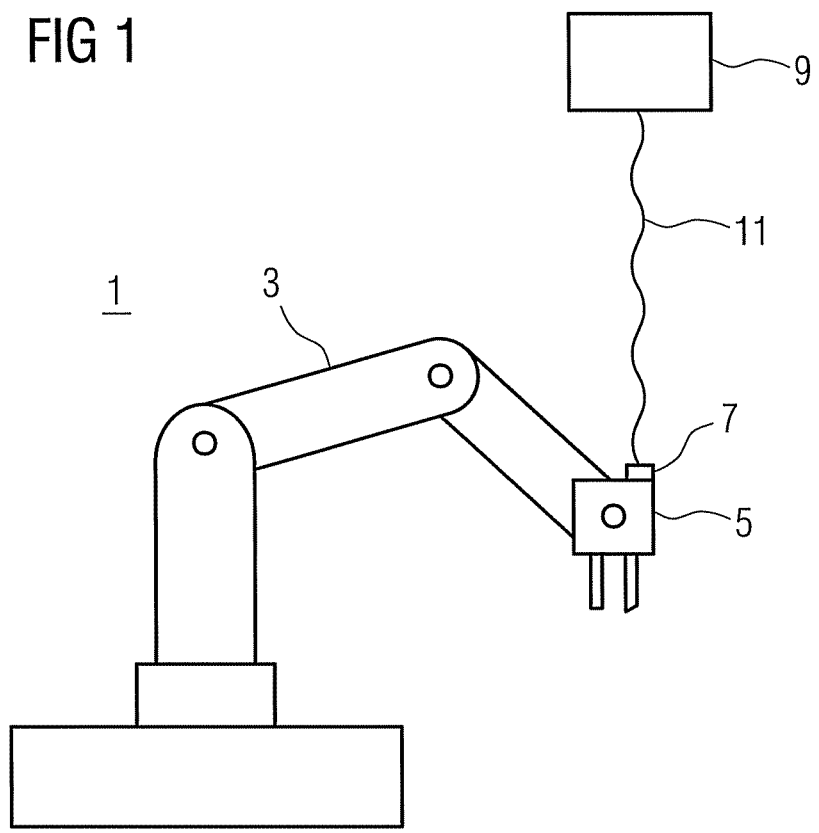
FIG. 1 shows a schematic representation of an industrial robot.

FIG. 1 shows an industrial robot 1. The industrial robot 1 has a multiaxial moveable robotic arm 3. A working head 5 is arranged at the end of the robotic arm 3, with which work steps, e.g. spot-welding can be performed on a component (not shown). A data recording module 7 is arranged on the working head 5. The data recording module 7 communicates on a wireless communication path 11 with a control system 9.

During operation of the robot 1, this passes through programmed work steps. To this end, parameters which enable the precise positioning of the working head for instance are monitored by way of sensors (not shown), e.g. distance sensors or a video camera. The sensor data is transmitted wirelessly to the control system 9 by way of the data recording module 7. The data recording module has a self-sufficient storage device, as is explained in more detail with reference to FIGS. 2 and 3.

FIG. 2 shows a data recording module 7 with a translational converter unit 21, which is connected to a storage device 23. The storage device 23 is in turn connected to a communication unit 25, by means of which the wireless communication is enabled. The converter unit 21 has a permanent magnet 31, which is suspended along its longitudinal axis between two springs 33. The magnet 31 is arranged in an electrical coil 35. A translational movement results in the magnet 31 oscillating and thus in electrical voltage being induced in the coil 35. This voltage charges the storage device 23 and provides electrical energy for the communication unit 25. In comparison to other methods relating to the self-sufficient power supply of wireless systems, this energy source offers a high density of electromagnetic energy and thus enables comparatively high transmission powers.

FIG. 3 shows a converter unit 21, which converts rotational movements. To this end, a magnet 31 is arranged in a rotational fashion on a half disk 41 comprising a lack of balance in respect of the axis of rotation. The magnet is arranged within a soft-iron yoke 43, around the opposite limb of which a coil 35 is wound. Rotational movements of the robotic arm 3 result in the magnet 31 rotating and thus in a magnetic flux in the yoke 43. This in turn induces an electrical voltage in the coil 35, which, as described above, provides the electrical energy for the data recording module 7. A high density of electromagnetic power can also be achieved with this converter.

The invention claimed is:

1. An industrial robot, comprising:
    a robotic arm; and
    a data recording module connected to the robotic arm, the data recording module being designed for a wireless communication and having a self-sufficient electrical power supply with an energy converter unit adapted to be responsive to an expected motion sequence of the robotic arm and configured to convert mechanical energy into electrical energy, wherein mechanical energy from a controlled movement of the robotic arm is converted by the converter unit into electrical energy to power at least the data recording module.

2. The industrial robot as claimed in claim 1, wherein the converter unit converts a translational movement into electrical energy.

3. The industrial robot as claimed in claim 1, wherein the converter unit converts a rotational movement into electrical energy.

4. The industrial robot as claimed in claim 1, wherein the converter unit converts a rotational and translational movement into electrical energy.

5. The industrial robot as claimed in claim 1, wherein the data recording module has an energy storage device in which the generated electrical energy is stored.

6. The industrial robot as claimed in claim 1, wherein the data recording module communicates by an industrial W-LAN communication standard.

7. The industrial robot as claimed in claim 1, wherein the data recording module communicates by a Bluetooth communication standard.

8. The industrial robot as claimed in claim 1, wherein the data recording module communicates by a ZigBee communication standard.

9. The industrial robot as claimed in claim 1, wherein the data recording module is arranged at a position of maximum average movement of the robotic arm.

10. A method of operating an industrial robot with a robotic arm, comprising:
    connecting a data recording module to the robotic arm;
    providing a self-sufficient electrical power supply with an energy converter unit for the data recording module;
    adapting the energy converter unit to be responsive to an expected motion sequence of the robotic arm to convert mechanical energy into electrical energy; executing a wireless communication by the data recording module; and
    converting by way of the energy converter unit mechanical energy from a controlled movement of the robotic arm into electrical energy to power at least the data recording module.

11. The method as claimed in claim 10, wherein a translational movement of the robotic arm is converted into electrical energy.

12. The method as claimed in claim 10, wherein a rotational movement of the robotic arm is converted into electrical energy.

13. The method as claimed in claim 10, wherein a rotational and translational movement is converted into electrical energy.

14. The method as claimed in claim 10, further comprising:
    providing an energy storage device for the data recording module; and
    storing the electrical energy in the energy storage device.

15. The method as claimed in claim 10, wherein the data recording module communicates by an industrial W-LAN communication standard.

16. The method as claimed in claim 10, wherein the data recording module communicates by a Bluetooth communication standard.

17. The method as claimed in claim 10, wherein the data recording module communicates by a ZigBee communication standard.

18. The method as claimed in claim 10, further comprising: arranging the data recording module at a position of maximum average movement of the robotic arm.

19. An industrial robot, comprising:
   a robotic arm;
   a data recording module coupled to control and monitor work performed by the robotic arm, the data recording module configured to provide wireless communication;
   a self-sufficient electrical power supply comprising an energy converter unit responsive to motion of the robotic arm and configured to convert mechanical energy into electrical energy to power the data recording module; and
   an energy storage device arranged to store surplus electrical energy from the energy converter unit.

* * * * *